Sept. 6, 1932.  C. A. JOHNSON  1,875,737
CHUCK
Filed May 5, 1928   2 Sheets-Sheet 2
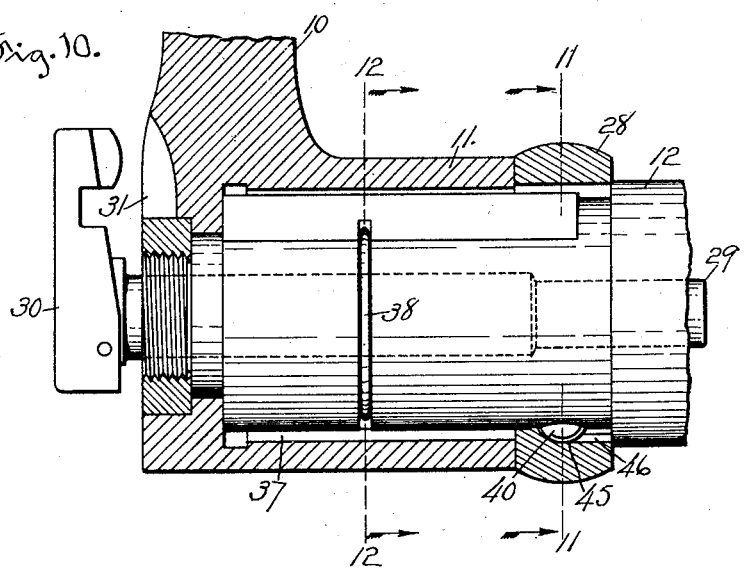
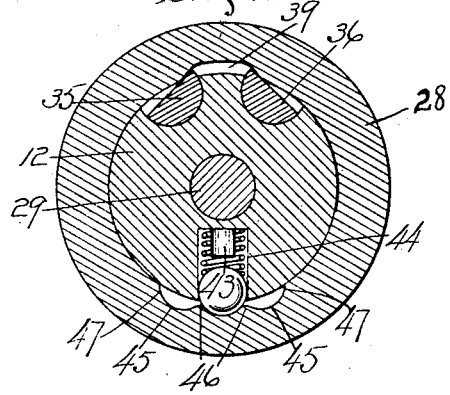
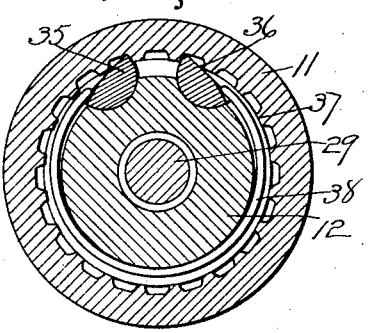
INVENTOR
Charles A. Johnson.
By
Arthur Jenkins,
ATTORNEY Patented Sept. 6, 1932

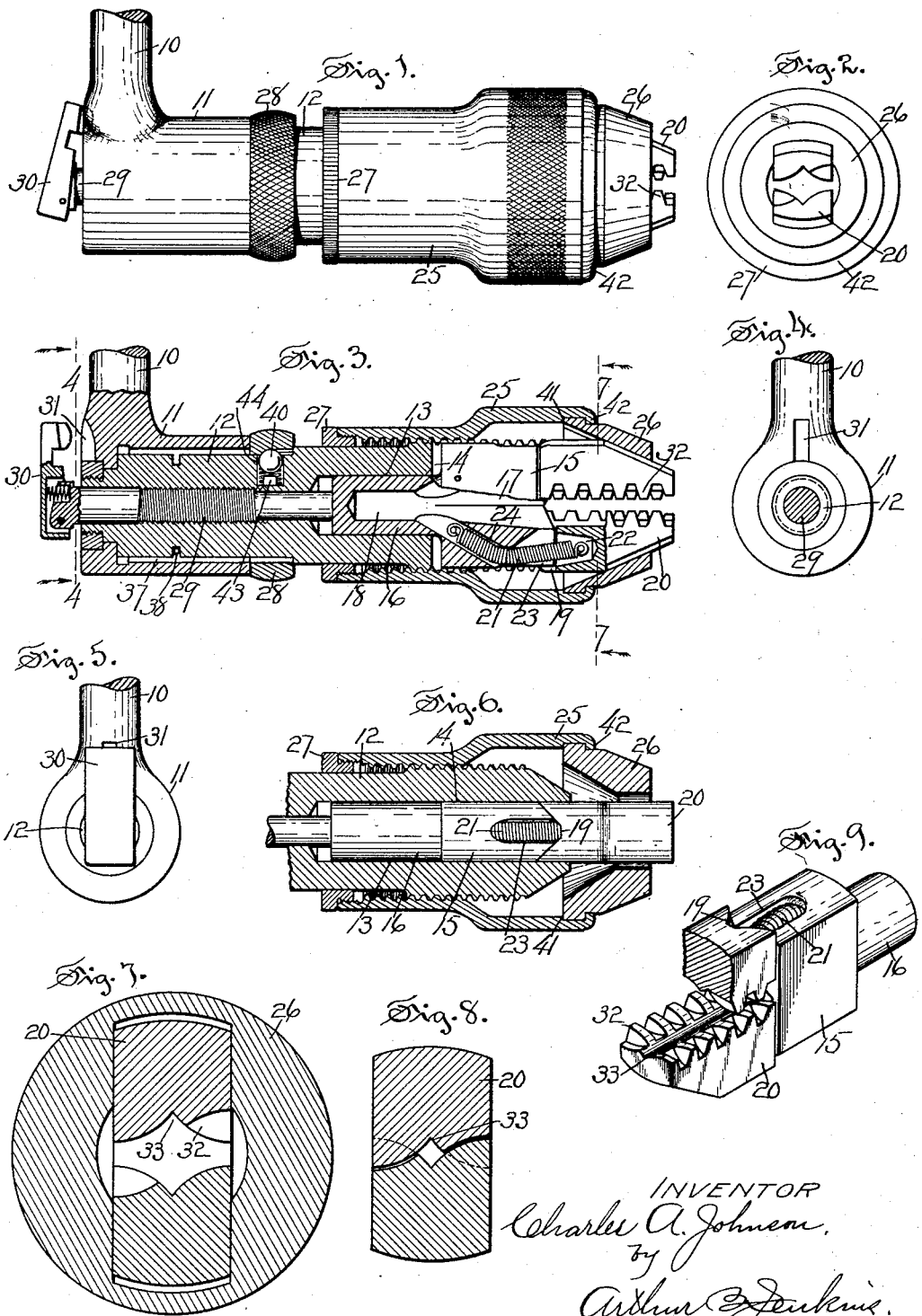

1,875,737

UNITED STATES PATENT OFFICE

CHARLES A. JOHNSON, OF UNIONVILLE, CONNECTICUT

CHUCK

Application filed May 5, 1928. Serial No. 275,319.

My invention relates to the class of devices employed for holding, drills, bits and similar tools, and an object of my invention, among others, is the production of a device of this kind that shall be particularly effective in the results obtained in its use, and particularly one in which an extremely tight grip may be obtained on the shank of a tool held thereby.

One form of a chuck embodying my invention and in the construction and use of which the objects herein set out, as well as others, may be attained, is illustrated in the accompanying drawings, in which—

Figure 1 is a side view of a chuck shown as attached to one end of a bit stock, and embodying my invention.

Figure 2 is an end view of the same.

Figure 3 is a view in central lengthwise section through my improved chuck.

Figure 4 is a view in cross section on a plane denoted by the dotted line 4—4 of Figure 3.

Figure 5 is an end view of the socket located at the end of the handle and showing my improved chuck attached thereto.

Figure 6 is a view in central lengthwise section through the outer end of the chuck on a plane extending at right angles to the plane of view of Figure 3.

Figure 7 is a view, scale enlarged, in cross section through the chuck body and on a plane denoted by the dotted line 7—7 of Figure 3, and illustrating the form of the two gripping edges of the chuck jaws which are shown as separated.

Figure 8 is a similar view through the jaws only but which are shown as closed.

Figure 9 is an isometric view showing the method of attachment of the chuck jaws to the jaw carrying head, one of the jaws being shown as broken off.

Figure 10 is a view, scale enlarged, partially in lengthwise section through the center of one end of the body and through the socket illustrating the clutch for securing the body and socket together.

Figure 11 is a view in section on a plane denoted by the dotted line 11—11 of Figure 10.

Figure 12 is a similar view on a plane denoted by the dotted line 12—12 of Figure 10.

While my invention is not limited to a chuck to be used in connection with any particular type of mechanism for rotating it, yet as I have found it to be particularly applicable for use in connection with bit stocks I have selected such type of tool for the purpose of disclosure of my invention herein, only such portion of a tool of this kind, however, which is sufficient for a clear understanding of my invention being illustrated. In the drawings the numeral 10 indicates a portion of the handle of a bit stock having a socket 11 formed preferably integral therewith and extending substantially at right angles to the portion of the handle shown. A chuck body 12 has one end extending into said socket and is freely rotatably attached to the bottom of the socket as by means of a reduced end extending thru a hole in said bottom and fitted with a nut outside of the socket, and as shown in Figure 3 of the drawings. This enables the handle to be turned independently of the body except when secured thereto by means to be hereinafter described. A hole 13 extends inwardly from the outer end of the chuck body and oppositely arranged slots 14 extend from said hole to the outer surface of the body and for a portion of the depth of the hole, and as shown in Figure 3.

A jaw carrier comprising a head 15 and a shank 16 is located within the chuck body, said head being located in the slots 14 and said shank extending into the hole 13. An opening 17 of angular shape in cross section extends inwardly from the outer end of the carrier, said opening terminating at its inner end in a closed round hole 18 comprising the bottom of said opening.

The end of the head 15 is preferably tapered in opposite directions to form a rib to be received in grooves 19 in the ends of chuck jaws 20 that are secured to the carrier by means of springs 21, preferably coiled, that serve as couplings for attachment of the jaws to the carrier, each spring or coupling being attached at one end within a recess 22 in the end of a jaw and extending through a slot 23 and into a hole 24 in the head 15, and in which hole the opposite end of the spring is secured, and as shown in Figure 3 of the drawings. The coils of the spring are preferably closed against each other so that the principal action is to exert a lateral force on the jaws, but at the same time to hold the jaws resiliently against the end of the head 15 with the ribs thereon located in the grooves 19 in the jaws.

The opening 18 from its mouth inwardly to a certain extent is tapered and of angular shape in cross section, this shape, as shown herein, being square. This enables the ends of drills that are of this general shape to be securely and firmly held, partially within the angular shaped part of the opening and partially between the jaws 20. With drills having round shanks the inner ends are located in the hole 18 while the shank further down is grasped by the jaws 20 thus firmly and securely holding the tool.

The jaw closing sleeve 25 is internally threaded to fit upon the threaded outer surface of the body 12, a jaw closing cap 26 being secured within the outer end of the sleeve and having a tapered opening to impinge against the tapered edges of the jaws to close said jaws together, in a manner common to structures of this class. A collar 27 is secured to that end of the sleeve opposite the cap 26, as by means of interengaging screw threads, this collar closing the opening between the end of the sleeve and the body 12, and also acting as a bearing to permit free movement of the sleeve on the body.

In the operation of the device thus far described the jaws are closed together by rotation of the sleeve 25 in one direction on the body, and the jaws are loosened by rotation of the sleeve in the opposite direction, in this latter movement the springs acting to move the jaws apart but retaining them in engagement with the end of the head 15. In securing the cap 26 to the sleeve 25 I provide a groove in the sleeve to receive a flange on the end of the cap. In doing this I provide a shoulder 41 on the sleeve against which the inner end of the cap is secured by means of a lip 42 on the end of the sleeve turned inward against a shoulder on the cap formed by said flange, and as shown in Figures 3 and 6 of the drawings.

It will, of course, be understood that the body 12 must be held against rotation in the operation of the sleeve 25 to loosen or tighten the jaws with respect to a tool shank, and it is also desirable to have the handle rotatable independently of the body at times either in one direction or in the opposite direction, this, however, being a feature common to bit stocks at the present time. Any desired mechanism for accomplishing this purpose may be employed, in the structure herein shown a clutch collar 28 being rotatably mounted on the body for operation of detents to secure the chuck body and socket 11 together. When in a central position the clutch collar positions the detents so that the socket 11 is rigidly secured to the body for rotation of the latter in both directions. When said collar is rotated in one direction from this central position the socket will be secured to the chuck body to rotate the latter in one direction only and when said collar is rotated in the opposite direction from the central position the socket will be secured to said body to rotate it in the opposite direction only and in a manner to be hereinafter described.

In order to obtain an extra tight grip of the jaws 20 on a tool shank I provide a tightening screw 29 threaded into the smaller part of the hole 13 in the chuck body hereinbefore referred to, said screw extending through said body 12, and as shown in Figure 3 of the drawings. This screw extends from the outer end of the body into the larger part of the hole or opening 13, said screw abutting at its inner end against the end of the shank 16. The outer end of this screw is provided with a holding lever 30 pivotally attached to the screw and having a lip adapted to engage a holding notch 31 in the end of the socket 11.

After the jaws have been set up against a tool shank as much as possible by the use of the sleeve 25 in the manner hereinbefore described the clutch collar 28 is turned to free the socket 11 from the body 12 so that the handle may be turned independently of said body. The lip of the lever 30 being now engaged with the notch 31 and the sleeve 25 being held against rotation the body 12 will also be held against rotation, and rotating movement being given to the handle 10 in the proper direction a further and much tighter grip of the chuck jaws on the tool shank will be obtained. The threads on the sleeve 25 and screw 29, in the structure herein shown, are right hand threads, the sleeve 25 being turned to the right to tighten the jaws and consequently the handle 10 will be turned in the opposite direction while the sleeve 25 is held to obtain the action of the screw 29 for tightening the jaws.

The jaws 20 are provided with gripping teeth 32 arranged in sets on opposite sides of the jaw and the teeth in one set being preferably staggered with respect to the teeth in the opposite set. The gripping edges of the teeth are curved downwardly into a groove 33 extending lengthwise along the center of the jaw, the curve of the teeth being such that a tool with a square shank will be grasped near the center, one of hexagonal shape will be grasped a little farther out on the tool, one of octagonal shape still farther out, and so on. A tool with a round shank will also be securely clamped. The hole 18 in the shank 16 will receive the end of a tool shank held by the jaws 20.

The clutch for connecting the body 12 and socket 11, hereinbefore referred to, may be of any ordinary type, that illustrated herein satisfactorily accomplishing the purpose, but it will be understood that other types may be employed. This mechanism, briefly stated, embodies two detents 35—36 located in grooves in the body 12 and having their opposite edges adapted to engage ratchet teeth 37 formed on the inner wall of the chamber in the socket 11. A spring 38 of circular form operates to force the toothed edges of the detents toward said ratchet teeth.

The clutch collar 28 has a controlling notch 39 within which the detents 35 and 36 are adapted to project, the edges of this notch operating on said detents to throw them into or out of position for engagement with or disengagement from the ratchet teeth 37, in a manner that will be readily understood.

The collar 28 may be releasably held as by means of a yielding detent 40 engaging notches on the inner surface of the ring and as shown in Figures 10 and 11 of the drawings in a manner that will be readily understood.

This detent 40 also acts as a stop to limit turning movement in both directions and this comprises a novel feature of my invention. This detent is seated on a spring, as shown in Figure 11. A stop pin 43 projects outward from the bottom of the socket 44 within which said spring is located, and within said spring. There are three detent receiving notches 45 located adjacent each other with ridges 46 btween them, the central notch locating the ring 28 in its central position and the outside notches locating said ring to engage one or the other of the detents 35–36 with the ratchet teeth 37. If the ring 28 be turned in either direction beyond these limits for engagement of the detents with said ratchet teeth it would be a difficult matter to again correctly position said ring, and it is the function of the stop hereinbefore mentioned to prevent turning movement of the ring 28 beyond said limits. The ridges 46 are less in height than the shoulders 47 formed by the outside notches and as shown in Figure 11. This permits the detent 40 to pass over said ridges without hindrance by the pin 43, but said pin will prevent said detent from moving inward far enough to pass the shoulders 47 and thereby a stop is formed to limit turning movement of the ring 28 at certain points in opposite directions.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A chuck including a support, a body journaled in said support, chuck jaws movably mounted in said body, a clamping sleeve threadedly engaging said body, means for connecting and disconnecting said support with respect to said body for rotation of the support independently of or with the body, a supplemental tightening member movably mounted in said body, and means for detachably connecting said supplemental tightening member to said support for rotation therewith.

2. A chuck including a support, a body journaled in said support, chuck jaws movably mounted in said body, a clamping sleeve threadedly engaging said body, means for connecting and disconnecting said support with respect to said body for rotation of the support independently of or with the body, a tightening screw threadedly engaging said body, and means for detachably connecting said screw with said support for rotation therewith.

3. A chuck including a support, a body attached to said support, chuck jaws movably mounted in said body, a clamping sleeve threadedly engaging said body, means for disconnecting said support from said body for rotation of the support independently of the body, a tightening screw threadedly engaging said support, a holding lever movably attached to said screw, and means on said support to engage said lever for rotation of said screw with said support.

4. A chuck including a support, a body attached to said support, chuck jaws movably mounted in said body, a clamping sleeve threadedly engaging said body, means for disconnecting said support from said body for rotation of the support independently of the body, a jaw carrier located within the body and on which carrier the jaws are mounted, a tightening screw projecting from the outer end of the body therethrough to contact with said carrier, a lever pivotally mounted on the projecting end of said screw, and means for detachably securing the lever to the support.

5. A chuck including a body, a loosely mounted jaw carrier attached to said body, chuck jaws, coiled springs maintained under lateral compression and each secured at one end to a chuck jaw and at its opposite end to said carrier to attach said jaws to the carrier and to exert a lateral force on said jaws, and a sleeve mounted on the body for operating said jaws.

6. A chuck including a body, a jaw carrier separately formed from and loosely supported by said body, chuck jaws, interengaging ribs and grooves between the jaws and carrier, flexible members attached to said jaws to connect them with said body, and a sleeve mounted on the body for operating said jaws.

7. A chuck including a body, a jaw carrier loosely attached to said body and having longitudinal slots and diagonal holes therein, chuck jaws, flexible members attached to said jaws and each extending along a slot and into a hole to be secured to said carrier to loosely attach the jaws to the carrier, and a sleeve mounted on the body for operating said jaws.

8. A chuck including a support, a body journaled in said support, chuck jaws movably mounted in said body, means for tightening said jaws, means for disconnecting said support from said body for rotation of the support independently of the body, supplemental jaw tightening means movably mounted in said body, and means for selectively connecting said supplemental tightening means to said support for rotation therewith.

9. A chuck including a body, a jaw carrier loosely attached to said body and movable independently thereof, transversely movable chuck jaws slidable on said carrier, interengaging guiding means between the jaws and carrier, means for retaining said interengaging guiding means in contact, and means for tightening the jaws.

10. A chuck including a body, a jaw carrier loosely attached to said body and movable independently thereof, transversely movable chuck jaws, interengaging guiding means for said transverse movement between the ends of the jaws and the carrier, resilient means connected to said jaws and the jaw carrier for supporting the jaws and for pressing the jaws against the carrier, and means for tightening the jaws.

CHARLES A. JOHNSON.